Dec. 20, 1938. McG. CLINE 2,140,514
METHOD OF TREATING PINE OLEO-RESINS AND PRODUCTS RESULTING THEREFROM
Filed Sept. 15, 1937
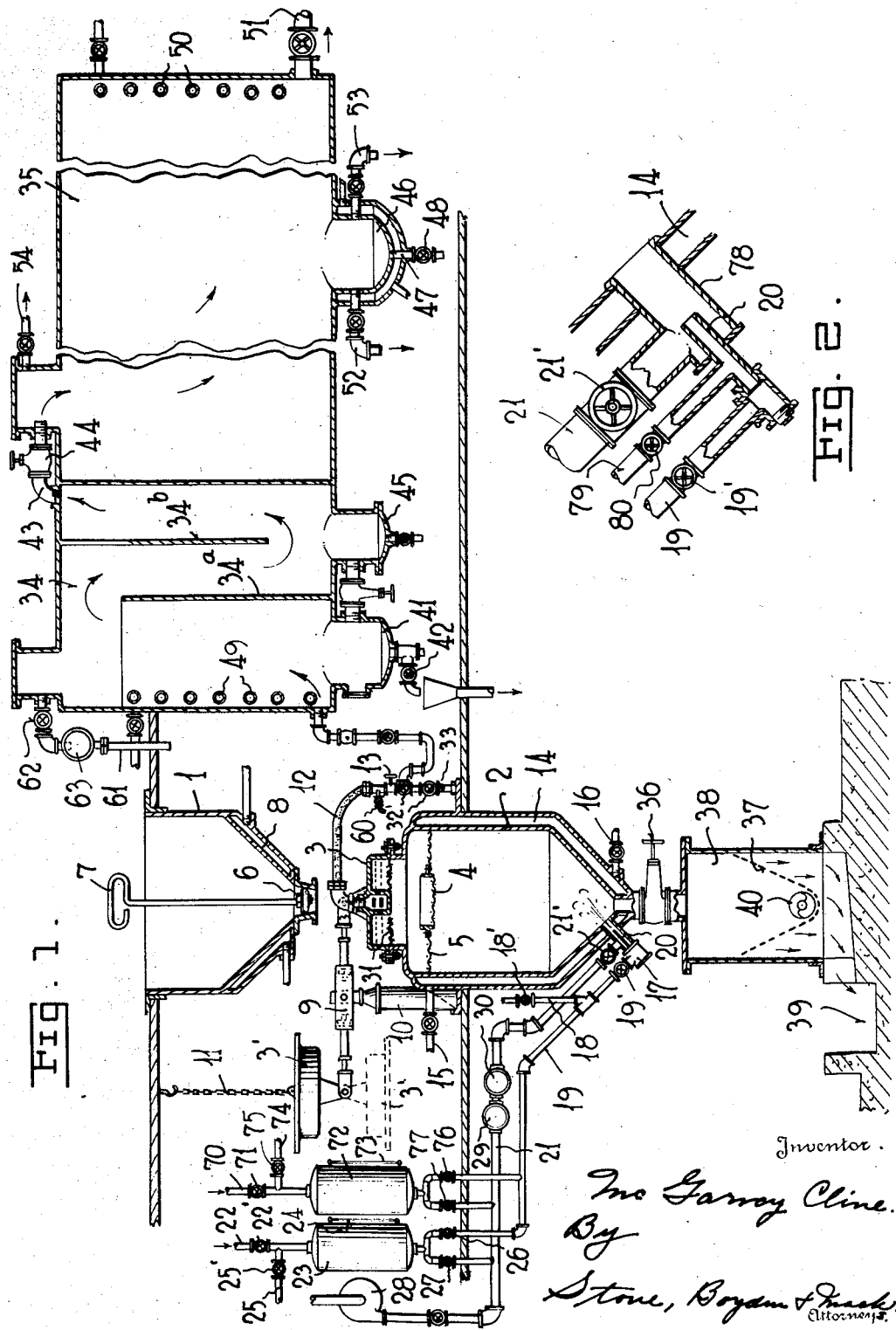

Patented Dec. 20, 1938

2,140,514

UNITED STATES PATENT OFFICE 2,140,514

METHOD OF TREATING PINE OLEO-RESINS AND PRODUCTS RESULTING THEREFROM

McGarvey Cline, Jacksonville, Fla.

Application September 15, 1937, Serial No. 164,085

28 Claims. (Cl. 260—107)

This invention relates to methods of treating crude pine oleo-resins and means for separating desirable from undesirable portions thereof. The invention relates also to new stable forms of oleo-resin resultant of such methods and suitable for bulk shipment and storage prior to utilization by consuming industries.

Crude pine oleo-resins are the exudates of living pine trees which are produced by the periodic scarification of the trees. The exudates flow from the severed resin ducts of the tree over the scarified face of the tree until they are directed by gutters, inserted in the trees, into cups placed on the tree for the collection of such exudates. The oleo-resin is periodically transferred from the cups into barrels.

Crude oleo-resin collected from pine trees is a heterogeneous mixture of materials containing primarily a mixture of crystalline resin acids and a viscous liquid solution of various materials such as terpenes, resin acids, substances generally termed resines, and other organic constituents produced in the plant synthesis of the material. This primary mixture is contaminated with many extraneous substances, as well as with modified oleo-resinous materials. The viscous liquid oleo-resinous aggregate is particularly subject to modification during the period of time it is exposed in flowing from the scar on the tree to the cups placed for the collection of the exudate. The flow progresses in the form of a slow moving film exposed to atmospheric oxidation and evaporation. The tacky surface of the film facilitates the accumulation of extraneous impurities by the exudate. Generally speaking the crystallized resin acids, associated with the viscous liquid oleo-resinous aggregate, are of relatively high purity, most of the non crystalline "resines", oxidized terpenes, and oxidized resin acids being distributed in the liquid aggregate. The general nature of the material treated by the process to be described below may be best shown by a more complete analysis of the component parts of the crude pine oleo-resin aggregate, especially those parts of the aggregate which may be classified as impurities, as follows:

1. Nonresinous organic materials which become associated with the oleo-resin during its synthesis in the tree.

*a.* Certain unidentified hydrocarbons. Some of these which are soluble in water have been separated and some of their general characteristics have been determined. One of these characteristics which is pertinent is that these hydrocarbons darken in color when heated. Their presence in gum rosins is at least partially responsible for color changes which occur when gum rosins are subjected to various heating operations or to various chemical reactions especially reactions involving the use of alkalies in which dark red and yellow coloring materials are produced.

*b.* Small amounts of water derived from the organic saps of the tree. This water is intimately associated with the oleo-resin, apparently in solution with portions of the crude aggregate, since its presence is not obvious from visual inspection. The organic acids mentioned in paragraph *c*, below, as well as some of the materials mentioned in paragraph *a*, are probably associated with this water and may effect its miscibility with the oleo-resin material.

*c.* Organic acids which are soluble in water and which are volatile within the temperature range usually employed in the distillation of pine oleo-resins. These acids are soluble in the oleo-resinous aggregate and also in the terpenes after they are separated from the oleo-resin. These acids consist largely of acetic and formic acids. Their presence in crude oleo-resin is the basis of the corrosive action of crude oleo-resin in contact with various metals. Their presence in gum turpentine causes discoloration of commercial turpentine when placed in various metal containers.

2. Metallic salts of acetic and formic acids. Metal gutters and metal cups made of galvanized iron are quite generally used for the collection of crude oleo-resin. The corrosive action of crude oleo-resin on these metals results in the formation acetates and formates. The iron salts of these acids are a common cause of color in gum rosins, especially in the lower grades of gum rosin. These salts are highly soluble in water but the present practice of processing crude oleo-resin does not remove them prior to distillation so that they remain in the rosin as an undesirable impurity.

3. Modified terpenes and resin acids produced during the period of exposure to which the oleo-resins are subjected in flowing from the resin ducts of the tree to the cup placed on the tree for its collection. Both terpenes and resin acids are unsaturated compounds which oxidize at atmospheric temperatures. The conditions of exposure in a slowly moving film are highly favorable to such oxidation. These oxidized oleo-resinous materials are largely responsible for the different colors in commercially graded gum rosins and are also responsible for much of the discoloration of products derived from various methods of processing gum rosins. The more highly oxidized oleo-resinous products are only slightly soluble in the oleo-resinous aggregate even when it is melted and heated to a temperature of 90 degrees C. They are, however, soluble in more concentrated terpenes and in hot melted rosin. Oxidation is progressive in oleo-resinous materials and lesser degrees of oxidation do not result in compounds which are as insoluble as the more highly oxidized forms. The general tendency of oxidation, however, is to lessen solubility and increase the specific gravity, also to darken the color.

4. Dust, pollens and various other finely divided foreign matter which are practically held in colloidal suspension in melted oleo-resins. The conditions of thin film exposure and the tacky properties of oleo-resin are exceedingly favorable for the collection of such impurities.

5. Chips of wood and bark, fine sand, pine needles and various other solids which from various reasons get in the cups and become mixed with the oleo-resin as it collects.

6. Rain water, much of which entering the cups flows over the bark of the tree. Such water may contain tannates and other vegetable extracts. This water does not mix in any intimate way with the oleo-resin, but some of it becomes involved with the viscous material in the form of drops and larger pockets. The amount of such water which may be present in crude oleo-resin varies greatly according to the weather conditions immediately preceding the collection of the gum from the cups, and with the care exercised in the collection of the gum. Crude oleo-resin sinks in water and adheres to the bottom and sides of the cups so that extraneous water in the cups may be poured out before the gum is placed in a larger receptacle. With ordinary care used in collection such water should not exceed approximately 8% of the total weight of the material collected.

One object of the present invention is to provide a practical, commercial process for efficiently removing from crude oleo-resins, impurities including any or all of those mentioned above.

A further object is to provide a process according to which impurities are removed from crude oleo-resins and whereby the purified material is obtained in a condition which renders it highly satisfactory for shipment or storage and for subsequent use. The use of wooden containers may be dispensed with, and instead metal containers may be employed without danger of corrosion, or of discoloration of the exudates.

A still further object is to provide a process which renders oleo-resinous material more highly desirable for conversion into high grade rosin and turpentine.

Another object is to provide a process of purifying and fractionating oleo-resins.

Another object is to provide an oleo-resin product having highly desirable characteristics.

The problem of removing the materials of groups 1 and 2 above is distinctly different from the problem of separating the material of group 6, above. Rain water with its associated impurities is not as intimately associated with the oleo-resinous material and its removal may be effectively accomplished by various means adaptable to securing a gravity sedimentation of this water from the oleo-resinous aggregate. By the process of the present invention, the sedimentation of this water and other impurities may be accelerated. The removal of water-soluble constituents of the crude oleo-resin described in groups 1 and 2 is herein accomplished by first establishing a condition favorable to diffusion of these water-soluble materials from the oleo-resinous material with which they are intimately associated to an aqueous solvent for them. Then, after diffusion takes place the aqueous solution is removed by gravity sedimentation or other suitable means other than by evaporation.

In order to accelerate the gravity separation of constituents of crude oleo-resin exudates the adhesive properties of the viscous aggregate must be greatly diminished or eliminated. It is also preferable to secure fluidity of the aggregate without the formation of solutions of the component parts with each other, which component parts may be oleo-resinous constituents of different specific gravity or of substantially the same specific gravity. The inhibition of solution is aided by eliminating excessive temperatures and solvents such as additional terpenes or other thinning agents. It is an object of my invention to further inhibit the formation of solutions by emulsifying the oleo-resin aggregate simultaneously with the operation of securing fluidity by heat or other means. An aqueous medium is used for the production of emulsions and for providing a fluid in which the emulsions may be kept suspended for desired periods of time, so that the aqueous suspension medium may act as a selective solvent for dissolving water-soluble materials contained in the crude oleo-resin.

By excessive temperatures, referred to above, I mean temperatures higher than the boiling point of the aqueous phase of the emulsion. (The boiling point of the oleo-resin emulsions is about 195° F. at atmospheric pressure.) Such excessive temperatures are avoided because they break the emulsions.

Water-soluble impurities are, as indicated above, removed by means of a selective solvent for them applied to the oleo-resinous material under conditions of intimate contact which permits diffusion of the water-soluble materials from the oleo-resinous material into the selective solvent; such diffusion being followed by a substantial separation of the selective solvent from the oleo-resinous material.

Intimate contact between agents employed in the present process and crude oleo-resins is obtained by emulsification as for instance with water and with various aqueous solutions. Emulsification may also, if desired, be combined with the use of solvents; solution and emulsification being preferably carried on simultaneously or in close sequence to each other. Crude oleo-resin aggregates may be converted from a viscous into a highly fluid state without converting the aggregates into substantially homogeneous solutions. Instead of being a solution a fluid aggregate may be a mixture of emulsified oleo-resinous materials suspended in or mixed with a surplus of an aqueous medium. When such emulsified aggregates are subjected to a period of sedimentation, the various classes of emulsions composing the aggregate substantially separate into layers superimposed on each other according to the specific gravities of the minute globules composing the emulsion. This separation may be accomplished without solution of one class of oleo-resinous material in other classes; the process of solution being limited to that which occurs prior to emulsification.

Aqueous emulsions of pine oleo-resin may be formed which are highly stable compositions of matter. They remain homogeneous in their composition and are excellently adapted for bulk storage and for bulk shipment in tank cars or other commercial containers. In fact these emulsions are so stable that they can be heated to temperatures below the boiling point of the aqueous emulsifying medium without breaking the emulsion. They are readily broken, however, by boiling such as occurs in a process of distillation, which process may be ultimately used to accomplish the separation of the emulsified oleo-resins into rosin and turpentine.

Stable emulsions of pine oleo-resin exudates are obtained which have as low as 1% aqueous emulsifying medium when brine is used to increase the specific gravity of the water used in excess of that required for emulsification. Water which may be associated with the emulsions in excess of approximately 1% may not be a part of the emulsion but may be mixed with the emulsion in the form of drops or larger globules. The use of brine is desirable as a means of reducing to a minimum the amount of aqueous medium held by the emulsion in the form of drops and larger globules. The removal of such water is desirable to lessen shipping weights, to lessen the amount of water ultimately removed by distillation, and to secure a more complete removal of water-soluble constituents of the crude oleoresin. The electrolytic properties of brine are also useful in facilitating the removal of colloidal solids, which action of brine is more fully discussed below.

While it may be a primary object of emulsification to obtain stable emulsified oleo-resinous products, the stability of the emulsions is not essential to the purpose of purification or fractionation of the crude oleo-resinous aggregate. In the latter instances, stability of emulsions for a period of time sufficient to meet the requirements of gravity sedimentation is satisfactory. The highly stable emulsified products are especially desirable to meet the requirements of bulk storage and shipment between the initial preparation of the emulsions and their ultimate utilization.

The use of turpentine or the like in conjunction with emulsification is primarily for the purpose of accentuating the difference in the specific gravity of the emulsified materials. Turpentine, itself, does not readily emulsify with aqueous solutions until its viscosity is increased by the solution of resinous materials; when this occurs, however, the solutions emulsify readily. Its use, therefore, associates with the operation of emulsification the action of a selective solvent as well as a means of accentuating differences in specific gravity. The viscous liquid constituents of crude oleo-resin enter into solution with turpentine much more readily than the crystalline constituents of the crude aggregate. In fact it is not desirable to add turpentine in excess of that which may be effectively emulsified with the liquid constituents, since such excess tends to lessen the difference in specific gravity between the emulsified liquid constituents and the emulsified crystalline constituents. By using turpentine with emulsification a substantial separation of viscous liquid constituents and crystalline constituents of crude oleo-resin may if desired be obtained without the use of heat and without the liquefaction or emulsification of the crystalline acids. In view of the general requirements of operating practicability, however, the emulsification process with the use of heat is preferred as a means of obtaining a progressive transition of the crude oleo-resin aggregate into a state of high fluidity. Finely divided fluid emulsions are adaptable to filtration so as to obtain an effective separation of the emulsified materials from the solid impurities ordinarily present in the crude oleo-resin aggregate. A condition of high fluidity also accelerates gravity sedimentation.

An important feature of the present invention is the separation from the oleo-resins of the materials of group 4 listed above, including the colloidal suspensions such as dust, pollens and other finely divided foreign matter. These finely divided solids which ordinarily remain in suspension in liquefied oleo-resin even after long periods of sedimentation, have greatly contributed to the difficulty of effective filtration of liquefied oleoresin. Their removal by means of filtration have required filtering media of relatively high density such as paper, felts and similar materials. Such media require high filtering pressures, extremely low viscosities, usually obtained with solvents and high temperatures, and relatively frequent replacement of the filtering media. All of these requirements mitigate against economical filtration to the degree of making the use of such media impractical from a commercial viewpoint. I have discovered, that after thorough emulsification with brine or the like these finely divided solids no longer remain in suspension but instead, settle out of the filtered emulsions along with the brine introduced in excess of that required for emulsification. They collect on the surface of the settled brine in a grayish foamy stratum which is removed together with the settled brine. This foamy stratum also contains some of the highest gravity emulsified oleo-resinous products. It is believed that this sedimentation is an instance of colloidal suspension being relieved by the use of an electrolyte. The importance of the sedimentation from the practical viewpoint is that it eliminates the necessity of removing these finely divided solid impurities by means of a filtering medium. If a filtering medium is used it may be of relatively high porosity, permitting high rates of filtration with low filtering pressures, relatively low temperatures and with viscosities readily obtained without the use of a solvent. In fact, the preferred porosity of the filtering media used in my process is one that permits the finely divided globules composing the emulsions to pass through it. A loosely woven, light-weight, Canton flannel has proved to be a satisfactory filtering medium.

Processing crude pine oleo-resin exudates by means of initially converting the exudates into finely divided fluid emulsions, which emulsions are temporarily kept suspended in an aqueous electrolyte of higher specific gravity than the emulsified materials, greatly facilitates the removal of solid impurities by means of filtration, in that it relieves the filtering medium from the duty of retaining colloidal and semi-colloidal solid materials. Such materials are carried out by the sedimentation of the electrolyte from the emulsified oleo-resin exudates. The nature of this sedimentation will be more fully discussed in connection with a description of apparatus in which my process can be economically carried out. The apparatus is shown by way of illustration in the accompanying drawing, in which:

Fig. 1 is a vertical sectional view partly in elevation of the apparatus; and

Fig. 2 is a cross sectional view of a modified portion of the apparatus shown in Fig. 1.

The process of the present invention may be described by explaining the operation of the apparatus. Features of the apparatus are described in detail in a copending application Serial No. 20,836, filed May 10, 1935.

Oleo-resinous material to be treated, particularly crude oleo-resinous material obtained from trees in the manner set forth above, is placed in a hopper 1 positioned above a vessel 2 provided with a removable filter head 3, and a removable screen 4 supported horizontally and centrally by a concentrically arranged fixed screen 5 at an upper level within the vessel 2. In charging the vessel 2, the filter head 3 is removed, the screen 4 is lifted out, and the valve 6 in the bottom of the hopper 1 is raised by pulling upwardly on the handle 7. The bottom of the hopper 1 is conical in shape and is kept warm by a steam jacket 8 so that the viscous aggregate will flow quickly from the hopper into the vessel 2. It is not desirable to melt any substantial portion of the charge while in the hopper since it is preferable that the melting be done in the vessel 2 in the special manner described below. A satisfactory batch of crude oleo-resins for treatment in the vessel 2 is from about eight to ten barrels. A ten barrel batch weighs approximately 4,350 pounds. After the hopper 1 has been emptied, a new batch of oleo-resinous material is introduced into it in order that a new charge may be immediately available when the vessel 2 is ready to receive it.

The filter head 3 is of any desirable construction but preferably of the type shown and described in my co-pending application Serial No. 20,836. Duplicate filter heads 3 and 3' are provided one on each end of a lever supported at its midway point on a post 10 so that both filter heads are balanced. The support for the lever 9, constructed as shown in the above application, permits of raising the filter head 3 up off the mouth of the vessel 2 and of rotating it about the post 10.

In the drawing the filter head 3' is shown hung by means of a chain 11 in an inverted position to permit of cleaning it while the other filter head 3 is in use. The normal position of the filter head 3' is shown in dotted lines.

After the vessel 2 has been charged, the screen 4 is replaced, and the filter head 3, fully assembled for filtration, is securely clamped on the vessel 2. The filter head 3 is connected to a flexible pipe connection 12 and the valve 13 is closed. The vessel 2 is then a vapor tight container filled with oleo-resin aggregate to a level preferably substantially below the level of the flange at the mouth of the vessel 2 to which the filter head is attached. For a ten barrel batch it is desirable to have an unfilled space in the vessel 2 between the upper level of the charge and the filter head of approximately 100 gallons, to allow for expansion during heating.

The vessel 2 is provided with a heating jacket 14 having inlet and outlet means 15 and 16 respectively for a fluid heating medium. The vessel 2 is also equipped with a pressure steam jet, generally designated by the numeral 17. The batch of oleo-resinous material may be melted, therefore, by means of indirect heat from the heating jacket 14 or by injecting live steam directly into the oleo-resinous material. Superheated or saturated steam may be introduced.

It is desirable that substantially all of the melting be accomplished by the injection of pressure steam in which case the steam moves at high velocity at the time it contacts the oleo-resin aggregate which is at a lower temperature than the steam. The initial action resulting from contacting high velocity steam with crude oleo-resins of lower temperature than the steam, is to form highly stable emulsions in which the aqueous emulsifying medium including condensed steam constitutes the dispersed phase of the emulsion. After the initial formation of stable emulsions (primary emulsions) in which the aqueous medium is the dispersed phase, secondary emulsions are formed in which the primary emulsions of oleo-resinous material become the dispersed phase of the secondary emulsions. These secondary emulsions are much less stable than the primary emulsions and their stability may be modified by regulating the relative specific gravity of the aqueous and the oleo-resinous components of the secondary emulsions.

Steam for emulsifying the oleo-resinous material is fed through a pipe 18 (having a valve 18') connected to a pipe 19 which in turn is connected to a jet 20 adjacent the bottom of the vessel 2. By way of example, approximately 70 pounds of injected steam may be used per barrel of crude oleo-resin to convert the oleo-resin into a mixture of primary and secondary emulsions heated to a temperature of approximately 190° F. The stable primary emulsions in which the aqueous medium is the dispersed phase, retain substantially one percent of their weight of such dispersed aqueous medium. If the average water content of a barrel of crude oleo-resin before treatment is approximately 31 pounds, the approximate condition of a batch of crude oleo-resin contained in the vessel 2 after violent agitation thereof by injection of the steam and at the time the temperature has reached approximately 190° F. may be determined. This condition may be visualized from the following table:

|  | Pounds |
|---|---|
| 1. Primary emulsions of various oleo-resinous constituents, reduced to emulsified form at their initial contact with high velocity steam; emulsification and melting having occurred substantially simultaneously | 3,900 |
| 2. Aqueous phase of secondary emulsions in which the above primary emulsions are the dispersed phase | 1,000 |
| 3. Chips, bark, pine needles, etc. | 120 |
| 4. Sand and miscellaneous fine trash | 30 |
| Approximate total weight of batch | 5,050 |

Obviously the materials in the above table and the condition of the charge will vary greatly. Quantitatively the figures given above have no specific significance. The highly stable primary emulsions may be regarded as compositions containing the oleo-resinous materials reduced to a finely divided globular condition and the secondary emulsion may be regarded as a suspension of these globules in an aqueous medium. The globules differ from each other in their specific gravity according to the variable specific gravities of the oleo-resinous substances which the globules contain. The rate of settlement of the various globules in the aqueous suspension medium varies with their specific gravity, the globules of higher specific gravity moving toward the bottom of the charge and those of lower specific gravity moving toward the top of the charge.

When agitation ceases in the vessel 2, the conditions for stratification of emulsified oleo-resinous materials through gravity sedimentation have been established. The relative specific gravity of the primary emulsions and the aqueous phase of the secondary emulsion, which aqueous phase may be regarded as a fluid suspension medium for the primary emulsions, determines the period of time during which sedimentation occurs. It is desirable to secure a substantially complete separation of the aqueous suspension medium of the secondary emulsion because it is this medium, which, during the period of time it is in intimate surface contact with the primary emulsions, acts as a selective solvent for water-soluble acids and other water-soluble materials contained in the crude oleo-resin aggregate. At the same time, however, its removal must not be accomplished so quickly as to substantially mitigate against its functions as a selective solvent and as a fluid suspension medium serving to accomplish a stratification of the stable primary emulsions. I have found that a substantially complete separation of the aqueous suspension medium may be obtained in a sedimentation period of approximately ten hours duration by adding approximately two pounds of sodium chloride per barrel of crude oleo-resin composing the batch being processed. The period of sedimentation can be shortened by increasing the amount of salt added, or lengthened by decreasing the amount. The salt may be introduced into the melter in crystalline or solid form at the time it is charged with crude oleo-resin or it may be introduced in the form of a concentrated solution through a pipe 21 prior to or while emulsification is in progress.

It has been previously stated that turpentine may be injected during emulsification in order to accentuate the difference in specific gravity of the primary emulsions produced from the crude oleo-resin aggregate. The turpentine to be thus added is introduced through a pipe 22 having a valve 22' into a tank 23 equipped with a slight gauge glass 24. Compressed air is admitted through a pipe 25 having a valve 25' to the tank 23 and the rate of injecting the turpentine into the vessel 2, as emulsification progresses, is regulated by means of a valve 26, in case it is injected with the steam in the pipe 19 or by a valve 27 in case it is injected through pipe 21. I have found that, generally speaking, satisfactory results may be obtained without the injection of turpentine. In connection with the emulsification of oleo-resinous aggregates containing relatively large proportions of semi-solidified oleo-resins, ordinarily called "scrape", the injection of turpentine is sometimes of sufficient advantage to warrant its use.

When the temperature of the emulsified oleo-resinous aggregate reaches approximately 190 degrees Fahrenheit, namely, a temperature, a relatively small number of degrees below the boiling point of the emulsion, the injection of steam is stopped and the period of sedimentation begins. The trash, bark, pine needles, etc. quickly collect on top of the fluid mass. Sand and other heavy material quickly settle to the bottom of vessel 2. The highest gravity emulsified oleo-resinous products start to gravitate along with the aqueous suspension medium toward the bottom of the container, while the lower gravity oleo-resinous emulsions collect at the top along with the floating trash. While this sedimentation is in progress, valve 13 and the desired header valve 32 are opened and filtration is started by the injection of high gravity brine into the bottom of vessel 2 through pipe 21. Instead of brine or sodium chloride solution, calcium chloride solution may be used. The solution may be that of any stable salt or other compound that has a high specific gravity, is freely soluble in water, and substantially or entirely inert with respect to oleo-resins.

The brine used as a liquid piston to force the emulsified oleo-resinous products in an upward direction toward the filter head 3, has a specific gravity of approximately 1.15 and is supplied by a pressure pump 28. The brine passes through a meter 29 so that the amount injected into the vessel 2, and the rate of injection may be observed. A pressure gauge 30 connected to the brine line 21 at any convenient point between the meter 29 and the vessel 2, indicates the hydrostatic pressure generated within the vessel due to the injection of the brine and the resistance of the filtering medium to the passage of the emulsified oleo-resins through said filtering medium. Satisfactory filtration can be obtained by employing pressures as high as 50 pounds or more per square inch. The use of lower pressures (about 10 to 20 pounds per square inch) results in better operation.

As indicated above the preferable filtering medium is one having a porosity which permits the finely divided emulsions to pass through it. A light weight Canton flannel or a free flowing, wire filter cloth are excellently adapted for the filtration of the emulsions. The preferred rate of filtration is one which requires from forty-five minutes to an hour to fill the vessel 2 with the high gravity brine. During this period of filtration the high gravity emulsified oleo-resinous materials have settled to the surface of the high density brine; a large proportion of the aqueous phase of the secondary emulsions has also settled, and, has become mixed with the high gravity brine producing a dilution of the high gravity brine by diffusion through the contact surface. The settled oleo-resinous emulsion thus becomes mixed with or suspended in the top stratum of the liquid piston.

The injection of the high gravity brine is stopped when the meter 29 indicates that the total gallons of brine injected equals the capacity, in gallons, of the vessel 2. At this stage of the operation some of the settled emulsified oleo-resins together with the floating trash contained in the charge are held beneath screen 31 in the filter head 3.

In commercial practice the flexible pipe connection 12 is connected to a header containing several valves 32. Pipes 33 running from the header connect with several units comprising separators 34 and storage tanks 35. At any stage of the filtering operation it is possible, therefore, to divert the filtrate into different tanks so that emulsions of different specific gravities are separately collected. The highest gravity emulsions are always diverted into a separate tank at the final stages of filtration by injecting brine into the vessel 2 in excess of the amount of brine required to fill the vessel. The heavy gummy materials are tacky and tend to adhere to the floating trash and a relatively small quantity of highest gravity emulsified oleo-resins becomes suspended in the high gravity brine. At the conclusion of the filtration of a batch, the vessel 2 is filled with high gravity brine, trash and various materials suspended in or in solution with the brine. All of these materials are then discharged through a valve 36; the chips and other solids are retained on a screen 37 in a chamber 38; and the liquid aggregate flows back to a brine storage tank through a channel 39 and a series of cooling vats (not shown). As the density of the collected brine is increased by cooling, emulsified oleo-resinous material and various gummy substances separate from the brine in the form of scum which floats on the surface and is removed therefrom. Solid matter collected on the screen 37 is removed therefrom by a screw conveyor 40.

Further sedimentation of the filtered oleo-resin emulsions assisted by vertical baffles 34$^a$ and 34$^b$ takes place in separators 34 and the settled materials collect in a sump 41 and are removed through a valve 42. The period of time for sedimentation in separator 34 is much longer than in the vessel 2; the separator is preferably so proportioned that material passing through it is retained in the separator for eight or nine hours, during which time further stratification of the oleo-resin emulsion occurs. The heavier emulsions accumulate in the separator 34 and the lighter emulsions flow through the separator into the storage tank 35 through a pipe 43 and a valve 44. The heavier emulsions which accumulate in the separator 34 may be periodically withdrawn from the separator through a sump 45. Aqueous solutions also settle in separator 34 and on the surface of these aqueous solutions floats a frothy scummy sediment which may be separately collected and processed. The aqueous sediment is slightly saline due to the salt added during emulsification in the vessel 2. The aqueous sediment and the scummy sediment are always removed from the separator 34 prior to the periodic removal of the heavier oleo-resin emulsions which gradually accumulate in the separator.

The aqueous sediment separated from the stable primary emulsions of oleo-resin contains in solution three classes of material originally present in the crude oleo-resin aggregate, namely, 1. Water-soluble acids which are responsible for the corrosive properties of crude oleo-resin with reference to various metals.

2. Metallic salts of the above acids produced from contact of the crude oleo-resin with metallic cups and gutters used for its collection. When the aqueous sediment is treated with a caustic soda solution the various metallic hydroxides are thrown out of solution as a flocculent precipitate. These metallic salts are highly undesirable adulterants of commercial gum rosins.

3. Organic water-soluble materials. These materials produce a deep red color when the aqueous sediment is treated with caustic soda. This color appears along with the precipitations mentioned above. When the red aqueous solution is separated from the precipitates by filtration and treated with sulphuric acid, another precipitation occurs. After this precipitate forms the aqueous solution becomes colorless. These materials are latent color bodies ordinarily present in gum rosins which are responsible for the red color of rosin soaps.

The amount of precipitations obtained from the aqueous sediment resulting from my process shows the efficacy of my process as a means of removing water-soluble adulterants of crude pine oleo-resins. The gravity stratification of the oleo-resin emulsions serves as a highly useful means of fractionating the crude pine oleo-resin aggregates into different classes of purified oleo-resins. Such fractionation has not been possible where the crude aggregates have been liquefied by methods which reduce the crude aggregates to solutions.

The following determination of water contents in three typical batches of crude oleo-resin being processed illustrate the degree of sedimentation that occurs in the vessel 2, and in the separator 34:—

| | Batch No. 1 | Batch No. 2 | Batch No. 3 |
|---|---|---|---|
| Water content of crude oleo-resin in charging hopper 1 | *Percent* 7.27 | *Percent* 6.12 | *Percent* 5.08 |
| Water content after emulsification in the vessel 2 | 22.00 | 21.10 | 20.20 |
| Water content of filtered emulsions as they come from the filter head 3 | 5.41 | 1.85 | 5.63 |
| Water content of emulsions after they have passed through the separator 34 | 1.29 | 1.23 | 0.75 |

These determinations indicate the relatively large amount of sedimentation which occurs in the vessel 2 during the period of time devoted to filtration. It is in the filtration stage of the operation that highly oxidized oleo-resinous materials are removed. These materials are relatively high in specific gravity and are relatively less soluble than the bulk of the oleo-resinous material. As indicated above some of the oxidized or gummy materials are deposited on the floating trash in the vessel 2. These materials are also found mixed with the diluted surface of the liquid piston (brine) in the vessel 2. After removal of the oxidized materials from the vessel 2 through the valve 36, along with the trash and the brine, and before recirculation of the brine in the process, such oxidized materials may be separated and collected and eventually distilled to produce low grade rosins such as grades B, D and E.

Most of the water-soluble impurities are removed before the emulsions reach the separator 34. The aqueous sedimentation in the vessel 2 dilutes the circulating stock of high gravity brine and gradually charges it with water-soluble impurities. This dilution of the high gravity brine requires periodic additions of salt to maintain its specific gravity and finally results in having to replace the adulterated brine with fresh brine in order to avoid undesirable accumulations of metallic salts and water-soluble hydrocarbons or other compounds in the high gravity brine. It has been more economical to renew the brine than to process it for the removal of metallic salts and hydrocarbons.

The sedimentation which occurs in the separator 34 is very important although it is relatively small in quantity. The aqueous sediment which is removed from the separator is highly charged with impurities and the foamy scum removed with it contains highly undesirable impurities. All of the aqueous content of the emulsions which pass into the storage tank 35 is not embodied in the stable primary emulsions. Additional water not in the dispersed phase may separate in the storage tank 35 and collect in a sump 46 from which it may be withdrawn by means of a drain 47 provided with a valve 48.

The vessel 2 and the separator 34 are preferably lagged to minimize heat losses so that the emulsions will remain very fluid during the period of sedimentation. If desired a heating coil 49 may be provided in the separator 34. Also, a heating means 50 may be provided in the storage tank 35 to make possible a more rapid removal of the oleo-resin product through an outlet 51 which leads to tank cars or other containers. Material from the storage tank 35 may also be withdrawn through pipes 52 and 53 connected to the sump 46 which may be steam jacketted. The pipes 52 and 53 may lead to stills or other means for converting the oleo-resin into rosin and turpentine, paper size, or other commodity. A pipe 54 connected to the top of the storage tank 35 serves as a vent.

In order that an operator may separate a given batch into various fractions and direct a fraction to the separator provided for it, a test valve 60 above the header to which the flexible pipe 12 is connected, may be opened from time to time to obtain a sample of the material flowing from the vessel 2 during filtration. An experienced operator can readily tell, from the color and general nature of a sample, at approximately what point the passage of the filtered material to a given separator is to be cut off and directed to another separator.

Any materials of lower specific gravity than the fraction of oleo-resins collected in a given separator, when such materials are found floating in the separator, may be removed through an outlet pipe 61 provided with a valve 62 and a sight glass 63.

My process results in the accumulation, in each of the storage tanks 35 of the apparatus described, of highly stable emulsions of pine oleo-resin from which impurities, with which the oleo-resinous material was contaminated when it was a constituent of the crude oleo-resin aggregate, have been removed. These emulsions remain homogeneous and fluid over long periods of time, without any substantial recrystallization of resin acids. They are substantially non-corrosive to metals and are generally adapted to storage in bulk and to transportation in tank cars or other containers. These emulsions are so stable that they can not be broken except by active boiling such as occurs in distillation. The stability of the oleo-resin emulsions is associated with a finely dispersed aqueous liquid phase. It is believed that the highly ionized water-soluble acids present in crude oleo-resin are effective emulsifying agents for producing the stable primary oleo-resin-water emulsions, with the aqueous solution of the acids as the dispersed phase. In this phase the acid solution is protected from dilution by the aqueous phase of the secondary emulsions in which the primary emulsions are suspended. After the aqueous phase of the secondary emulsions has been removed by sedimentation the dispersed aqueous phase of the primary emulsions does not come in contact with the metal containers which may be used for the storage and shipment of the stable primary emulsions. The dispersed aqueous phase of the stable emulsions, therefore, does not effect corrosion even though it does contain some of the acids which are corrosive when in direct contact with metal.

My method of emulsifying the crude oleo-resinous aggregate by means of high pressure steam injected into cold crude oleo-resin aggregate is peculiarly adapted to the initial formation of the primary emulsions and to the subsequent formation of the secondary emulsions having a voluminous water phase in intimate surface contact with the finely divided globules of the stable emulsions. Similar two stage emulsification can be produced by means of mechanical agitators but my steam jet method is much more effective and economical. It is especially effective in the formation of the stable primary emulsions which are associated with a dispersed aqueous phase apparently of relatively high acidity. As the injected steam, moving at high velocity, contacts the cooler oleo-resin, condensation and melting occur simultaneously. The dispersed initial condensation makes contact with the water-soluble acids dispersed through the crude oleo-resinous aggregate and thus forms the dispersed phase of the stable primary emulsions.

With hot emulsification the aggregate amount of the dispersed liquid phase is small, not generally exceeding about one percent of the weight of the stable emulsions of which it is a part. The quantity of acid, therefore, contained in this liquid phase is only a small proportion of the total water-soluble acids originally present in the crude oleo-resin. The great proportion of these acids is dissolved in the external aqueous phase of the secondary emulsion and is removed with this aqueous phase after sedimentation. This is likewise true with respect to other water-soluble materials present in the crude oleo-resin aggregate.

The water solution, which is removed during the period of sedimentation, contains the highly corrosive acids which were present in the crude oleo-resin, the salt added to increase the specific gravity of the solution, and other water-soluble materials present in the crude oleo-resin. This aqueous solution is highly corrosive to metals. The small traces of acid substances which remain dispersed in the stable primary emulsions have substantially no corrosive action on account of their dispersion. The corrosive properties of the separated aqueous solution become particularly noticeable in the bottom part of the vessel 2 and separator 34 and, to a less degree, in the bottom parts of the storage tanks 35. The drainage sumps are particularly subjected to the corrosive action of the aqueous sediment. The corrosive acids also accumulate in the high gravity brine used as a liquid piston in the filtration apparatus and in this instance affect the durability of screens, pumps, and other metal equipment with which the high gravity brine comes into contact.

In copending applications Serial No. 34,623, filed August 3, 1935, and Serial No. 24,981, filed June 4, 1935, I have described a method of introducing alkaline agents in vessel 2 during the process of emulsifying the crude oleo-resin exudates. Such use of alkali serves to protect plant equipment from the corrosive action of the aqueous solutions. Another highly effective means of eliminating corrosion in plan equipment is to use suitable metals which are resistant to the corrosive acids contained in the aqueous solutions. By using such metals the general formation of rust incident to the use of mild steel equipment is also eliminated. On this account it is preferable to use resistant alloys in plant equipment, and when such alloys are used it is not at all necessary to resort to the methods of the above mentioned applications. It is to be understood that the main purposes of the aqueous suspension medium are, 1. To act as a selective solvent for the various water-soluble materials contained in the crude oleo-resin exudates being processed and by the solution of such materials to accomplish their removal from the stable emulsions when the aqueous medium is removed from the emulsions by means of gravity sedimentation. These purposes are best served by maintaining the acidity of the aqueous suspension medium until it is removed by sedimentation in separator 34. Neutralization of acidity in vessel 2, is a modification of the process which adapts it for use with equipment constructed of mild steel.

2. To act as a fluid suspension medium for the oleo-resin emulsions so as to permit these emulsions to arrange themselves freely according to the relative specific gravity of the globules composing the emulsions. This purpose is best served by simultaneous melting and emulsification so as to avoid the formation of solutions of various constituents of the crude aggregate with each other.

3. To serve as a medium for collecting colloidal and semi-colloidal solids which are present in the crude oleo-resin exudates and carrying these solids with it as it settles from the oleo-resin emulsions. This is of primary importance as an aid to filtration. In fact, this principle of removing finely divided solids is, apparently, a vital element in the economic filtration of crude pine oleo-resin exudates.

All of the above three functions of the medium described are functions of the secondary emulsions formed with the higher gravity aqueous medium and they depend upon the fact that these secondary emulsions are only moderately stable. The initial formation of the highly stable oleo-resin emulsions in which an acid aqueous medium is a dispersed phase has no relation to accomplishing the objectives enumerated above but it has been discovered that it is this type of emulsification which produces an oleo-resin product that remains homogeneous in its structure through a sufficiently long period of time to meet the requirements of bulk transportation and storage of the commodity prior to its ultimate use by consuming industries.

It will be observed from the foregoing description and data that the secondary emulsions separate at a variable rate. The initial separation of the aqueous medium is at a comparatively rapid rate and occurs in the vessel 2. In two examples cited approximately 75% of the aqueous medium separated from the secondary emulsion in the vessel 2, while in another example cited approximately 90% of the aqueous medium separated from the emulsion in the vessel 2. It is obvious that the percentage of this aqueous medium which separates in the vessel 2 is a function of the specific gravity of the aqueous medium and of the period of time the secondary emulsions are held in the vessel 2. The control of both of these variables is a part of the operating technique of my process, which may readily be adjusted to obtain an observed performance. The separation which occurs in the vessel 2 is of greatest aid to filtration and if necessary the charge may be retained in the vessel 2 until after substantially all of the aqueous medium has separated from the secondary emulsion. The fact, however, that the separation can be carried out in two distinct phases greatly facilitates the rapidity of the filtration.

A very high percentage of the total colloidal and semi-colloidal materials present in the crude oleo-resin aggregate is carried down by the aqueous medium which separates in the vessel 2. It is the fact, however, that such colloidal material as may pass through the filtering medium is later removed by the continued sedimentation of the aqueous medium in the separator 34, that permits high rates of filtration obtainable with a relatively porous and free-flowing filtering medium. Heretofore, efforts to filter pine oleo-resin exudates have dealt with solutions of the exudates either obtained by means of heat or by means of added solvents, or both of these means combined. In such cases the colloidal and semi-colloidal materials remained suspended in the solutions and their removal had to be accomplished by the filtering medium. Their removal in this manner necessitated filtering media of relatively high density and also high fluidity of the oleo-resins usually obtained with added solvents and high temperatures, and also high filtering pressures. Rates of filtration were so low and operating costs so high that the commercial filtration of pine oleo-resin exudates was deemed impractical. The process herein described has introduced the filtration of crude pine oleo-resin exudates as a commercial art, and, incidentally, it produces new homogeneous forms of pine oleo-resin exudates suitable for bulk shipment and storage.

The viscosity temperature relations of my oleo-resin emulsions are shown by the following viscosities taken on a Stormer Viscosimeter. Typical samples were used in these tests.

| Sample 1 | | Sample 2 | | Sample 3 | |
| --- | --- | --- | --- | --- | --- |
| Temp. | Viscosity | Temp. | Viscosity | Temp. | Viscosity |
| °C. | | °C. | | °C. | |
| 30 | 60'-0" | | | | |
| 40 | 16'-0" | | | | |
| 50 | 5'-0" | 50 | 5'-28" | 50 | 4'-10" |
| 60 | 1'-40" | 60 | 1'-38" | 60 | 1'-52" |
| 70 | 0'-43" | 70 | 0'-41" | 70 | 0'-40" |

It may be said, with reference to the above viscosities, that emulsions having a viscosity of 60' are viscous fluids which readily flow through spouts 8 inches in diameter from elevated storage tanks into tank cars. An 8,000 gallon tank car can be filled with such material in approximately one hour. Materials having viscosities of approximately 5 minutes can be readily handled with pumps. Viscosities of less than 5 minutes indicate high degree of liquidity. These data indicate that for pumping, my oleo-resin emulsions should be heated to at least 50 degrees C., or to 122 degrees Fahrenheit.

The operations thus far described, result primarily in the production of filtered emulsions of pine oleo-resin exudates in which an acid aqueous medium is the dispersed phase of the emulsion. This dispersed phase aggregates approximately 1% of the weight of the emulsion. Such emulsions have the stability to meet all of the requirements of bulk transportation and storage prior to their use for the production of rosin and turpentine, or direct use for the production of soap, paper size or other products.

While the dispersed aqueous phase of these emulsions contains some of the corrosive acids originally present in the crude oleo-resin, this dispersed phase does not come in contact with vessels which might be used for the storage and transportation of the products. It has been pointed out previously, however, that all of the aqueous medium, in which the emulsions were suspended during their preparation, may not be separated from the emulsions during the period of sedimentation. The instances cited are typical of good commercial plant operation. In these instances the separation of the aqueous suspension medium is substantially complete. In commercial operations, however, overcrowding of equipment is frequently necessary and emulsions may be produced which contain larger amounts of the aqueous suspension medium dispersed through the emulsion in the form of droplets. As long as such droplets remain suspended in the emulsion they have no corrosive action on the metal containers except where they contact the metal. Corrosion resulting from such limited contact is negligible. If the suspended aqueous solution settles out of the emulsion on long standing some corrosive action may be localized at the bottom of mild steel containers, since these aqueous solutions are both mildly acid and saline. While, commercially, such possibilities of corrosion are of little importance, means of preventing it may be provided if such suspended water is used in the formation of a soap solution. The acidity may thus be neutralized and the soap solution may be advantageously incorporated as a stable ingredient of the emulsion.

Let it be assumed that it is desired to produce emulsions containing as high as 4% of the aqueous suspension medium held suspended in the emulsions, or, to protect the emulsion against a possible aqueous suspension of this amount. Let it be assumed also that it is desired to incorporate this suspended water into a 10% soap solution, (approximately). The medium for producing the desired amount of soap, say, is a 10% solution of NaOH. One pound of such solution added to the oleo-resin would produce approximately 0.82 pound of resin soaps incorporated with .9 pound of water contained in the solution of NaOH. It would require approximately 6.5 pounds additional water to produce a 10% soap solution and with 4 pounds of suspended water available per 100 pounds of emulsion, it would require 160 pounds of emulsion to supply the water required to produce a 10% soap solution. It would therefore take 1 pound of 10% NaOH solution per 160 pounds of emulsion to accomplish the desired result. The acidity of the aqueous medium suspended in the emulsion would, of course, modify slightly the actual amount of resin soap produced by the added alkali since some of the alkali would be used in neutralizing the water soluble acids. Sample 3, above, is an emulsion in which the suspended aqueous medium was fixed by its conversion into a 10% soap solution. It will be seen that the soap solution has little effect on the viscosity temperature relations of the emulsion. It has been observed, however, that emulsions processed in this way are very stable and are entirely free from corrosive action on metals. Aqueous solutions of other alkalis as well as ammonium hydroxide may be used as means of forming soap solutions within the emulsions. Prepared solutions of resin soap may also be used instead of aqueous solutions of various alkalis.

The general procedure of calculating the amount of alkaline agent require to produce a desired soap solution is the same as that outlined for a 10% solution of NaOH. The alkaline agent must be introduced gradually while the oleo-resin aggregate is being effectively stirred or agitated so as to obtain a uniform production and distribution of the soap solution throughout the oleo-resin aggregate. The operation of forming the soap solution is carried out most effectively when the temperature of the oleo-resin is merely high enough to produce moderate fluidity.

Proper sedimentation in the process herein described eliminates the desirability of introducing soap solutions as an ingredient of my oleo-resin emulsions. Producing non-corrosive and stably homogeneous oleo-resin aggregates by means of incorporating the water content of the oleo-resin into a soap solution is primarily applicable to the treatment of small batches of oleo-resins not tributary to properly equipped processing plants. Crude oleo-resins as collected from the forest contain approximately 8% of water entrapped in the viscous aggregate. This water will vary through considerable limits. By melting the crude aggregate and straining the liquefied material all extraneous trash except finely divided trash can be removed. Then by stirring in 1 pound of 10% sodium hydroxide solution per 180 pounds of liquefied oleo-resin the acid aqueous content of the oleo-resin is converted into a soap solution, which incorporated with the oleo-resin, inhibits recrystallization of resin acids and makes the oleo-resin aggregate non-corrosive to metal containers. This is one simple method which I have discovered for converting crude oleo-resin aggregates into a non-corrosive, stably homogeneous commodity adapted for bulk transportation and storage.

In this discussion a 10% soap solution has been used merely as an example and not as a definition of a significant limit. Dilute soap solutions, say 2% to 4% solutions, are good emulsifying agents for producing emulsions of oleo-resin having continuous aqueous phases. In such emulsions the continuous aqueous phase aggregates approximately 25% of the weight of the emulsion.

By injecting a suitable alkaline medium into the vessel 2 within the period of time devoted to the emulsification of the batch of crude oleo-resin, the corrosive acids can be neutralized before they are discharged from the vessel 2. In fact it is highly desirable, from the standpoint of equipment cost and depreciation, to neutralize the corrosive acids after they have been dissociated from the crude oleo-resin, and prior to their discharge from the vessel 2. Such neutralization prevents the accumulation of corrosive acids in the high gravity brine. The neutralization may be accomplished in a manner which maintains the high gravity brine in a state of slight alkalinity, a feature not heretofore practiced. This results in effectively inhibiting corrosive action of the brine on the metals with which it comes in contact. The corrosive action in the separator 34 and storage tank 35 is also inhibited. Another important result incident to the neutralization of the aqueous suspension medium is, that when this medium is alkaline its association with the stable oleo-resin emulsions eliminates the chances of securing corrosive emulsions due to any possible ineffective separation of the aqueous suspension medium from the emulsions during the period of sedimentation.

The hydroxides of the alkaline earth metals such as calcium, barium, strontium, or magnesium are the most suitable alkaline agents to use, since they react readily with the highly ionized water-soluble acids but do not react appreciably with the resin acids under the temperature conditions associated with emulsification and filtration. This selective activity of these alkaline materials permits their use without regard to the possible effect of them upon the resin acids. They may be introduced into the vessel 2 in amounts greater than necessary to neutralize the water-soluble acids without the production of water-soluble resinates, which would occur with excess amounts of hydroxides of the alkali metals. The hydroxides and carbonates of the alkali metals such as sodium and potassium can be used but their use is associated with the necessity of determining with approximate accuracy the amount of water-soluble acids present in the crude oleo-resins being processed.

The quantity of water-soluble acids present in crude pine oleo-resins may be determined by separating all of the volatile constituents of the oleo-resin by means of steam distillation in a manner that retains all of the aqueous distillate. The acidity of this aqueous distillate is then determined by means of ordinary methods of titration. Generally the amount of water-soluble acids contained in an average barrel of crude oleo-resin require for their neutralization approximately 11 grams of NaOH, or approximately 10 grams of Ca(OH)$_2$. If a saturated cold water solution of Ca(OH)$_2$ is being used for neutralization, about 1½ gallons of solution per barrel (435 pounds) of crude oleo-resin being processed would have to be injected. Effective results, however, can be obtained by injecting Ca(OH)$_2$ in the form of milk of lime. For reasons given above, Ca(OH)$_2$ is the preferable alkaline reagent to use and it is used in appreciable excess quantities to that required for the theoretical neutralization of the water-soluble acids since the amount of water-soluble acids present in crude oleo-resin vary in different classes of crude. In commercial practice sufficient Ca(OH)$_2$ is injected into the vessel 2 to maintain the high gravity brine, used as a liquid piston in the filtration operation, in a state of slight alkalinity.

The alkaline solution to be injected into the vessel 2 passes through a pipe 70 having a valve 71, into a tank 72 provided with a gauge glass 73. Compressed air is passed into the top of the tank 72 through a pipe 74 having a valve 75.

The volume of alkaline solution forced from the tank 72 is indicated by the change in liquid level in the tank as shown by the gauge glass 73. By means of outlet valves 76 and 77, the alkaline solution may be injected into the vessel 2 through the pipe 19 and jet 20 together with the high velocity steam supplied by the pipe 18 or, it may be injected through the pipe 21.

In the modified injection means shown in Fig. 2, the pipe 21 provided with a valve 21' is connected to a side of a nozzle 78 which may be substituted for the injecting nozzle shown in Fig. 1. The alkaline reagent fed through a pipe 79 having a valve 80 that is connected to the tank 72 mixes in the injecting means 20 with the steam fed by the pipe 19 having a valve 19'.

The alkaline solution may be gradually admitted throughout the period of melting and emulsification, in which case the water-soluble acids are neutralized as rapidly as they are dissociated from the crude oleo-resin, or the alkaline solution may be admitted in the last stages of the melting and emulsification operation. This latter method of injecting the alkaline solution is preferable because the solvent action of the aqueous suspension medium is increased by its acidity. It is preferable, therefore, to first build up the acidity of the aqueous suspension medium and postpone the neutralization of the acidity of said medium as long as possible.

It is to be understood that the main purpose of the aqueous suspension medium is to act as a selective solvent for the various water-soluble materials contained in the crude oleo-resin being processed and by its solution of such materials to accomplish the separation of said materials from the stable emulsions when the aqueous medium is removed by means of gravity sedimentation. These major purposes are best served by maintaining the acidity of the aqueous suspension medium until it is removed by sedimentation in the separator 34. Neutralization of this suspension medium in the vessel 2 in the manner just described, is presented as a modification which adapts the process to the use of equipment constructed of mild steel or aluminum for instance instead of more expensive metals such as stainless steel which may be more resistant to the corrosive properties of the said aqueous solution removed by sedimentation.

When the aqueous suspension medium is neutralized in the vessel 2, in the manner described above, precipitates are formed and these precipitates settle in the vessel 2 while filtration is in progress and are finally discharged from the vessel along with the high gravity brine and solids removed by filtration. These precipitates are of such high specific gravity that they settle in the high gravity brine and after sedimentation are removed from the high gravity brine. Neutralization of the high gravity brine used as a liquid piston in the filtration process may be accomplished as an operation unrelated to neutralization within the vessel 2. The result of neutralization in the vessel 2, however, is to maintain the high gravity brine in a state of slight alkalinity.

The emulsion products obtained in my process preferably contain no crystals or substantially no crystals of resin acids and as indicated above recrystallization of such acids, after melting and emulsification of the oleo-resin exudates, is inhibited.

The present application is a continuation in part of application Serial No. 20,836, filed May 10, 1935, and of application Serial No. 34,623 filed August 3, 1935, and of application Serial No. 24,981 filed June 4, 1935.

I claim:

1. A method comprising mixing together water and crude oleo-resin exudate to prepare a relatively unstable emulsion containing a continuous water phase and globules of a relatively stable emulsion having a dispersed phase containing water and a continuous phase containing oleo-resinous exudates obtained from pine trees, removing particles of waste matter contained in the oleo-resinous aggregate, and separating the said relatively stable emulsion from the said continuous water phase of the said relatively unstable emulsion.

2. A method comprising mixing together water and oleo-resin exudate to prepare a relatively unstable emulsion containing a continuous water phase and globules of a relatively stable emulsion having a dispersed phase containing water and a continuous phase containing oleo-resinous exudates obtained from pine trees, removing solid waste matter, water-soluble matter, and modified terpenes and modified resin acids contained in the oleo-resinous aggregate, and separating the said relatively stable emulsion from the said continuous water phase of the said relatively unstable emulsion.

3. A method comprising mixing water and oleo-resinous exudates obtained from pine trees to form an emulsion, discontinuing the mixing and causing the resulting mixture to separate by sedimentation into a plurality of fractions containing emulsions of different specific gravities, and separately collecting the said fractions.

4. A method comprising mixing water and oleo-resinous exudates obtained from pine trees to form an emulsion, discontinuing the mixing and causing the resulting mixture to separate by sedimentation into a plurality of fractions containing emulsions of different specific gravities, separating from the resulting stratified material solid waste matter, water-soluble matter, and modified terpenes and modified resin acids contained in the oleo-resinous aggregate, and separately collecting the said fractions.

5. A method comprising mixing water and oleo-resinous exudates obtained from pine trees to form an emulsion, which emulsion contains a mixture of oleo-resinous emulsions of different specific gravities, adding turpentine to accentuate the differences in specific gravities of the said emulsions, causing the resulting mixture to separate by sedimentation into a plurality of fractions, and separately collecting the said fractions.

6. In a method of treating oleo-resinous exudates obtained from pine trees, mixing the said oleo-resinous exudates and an aqueous medium substantially inert with respect to the said exudates and of higher specific gravity than the oleo-resinous aggregate of the said exudates to form a relatively unstable emulsion containing the said aqueous medium in a continuous aqueous phase, and a dispersed phase containing a relatively stable emulsion of the oleo-resinous aggregate and the said aqueous medium, and effecting a separation of the relatively stable emulsion from the said continuous aqueous phase.

7. In a method of treating oleo-resinous exudates obtained from pine trees, mixing the said oleo-resinous exudates and brine to form a relatively unstable emulsion containing a continuous brine phase and a dispersed phase containing a relatively stable emulsion of the oleo-resinous aggregate and brine, and effecting a separation of brine and the relatively stable emulsion.

8. In a method of treating oleo-resinous exudates obtained from pine trees, mixing the said oleo-resinous exudates and water to form an emulsion and to dissolve in the water the water-soluble acids contained in the said oleo-resinous exudates, mixing an alkaline agent with the emulsion to reduce the acidity of the said water-soluble acids, and separating emulsified oleo-resinous aggregate from the resulting mass.

9. In a method of treating oleo-resinous exudates obtained from pine trees, mixing the said oleo-resinous exudates and water to form an emulsion and to dissolve in the water the water-soluble acids contained in the said oleo-resinous exudates, and while effecting emulsification adding an alkaline agent to combine with water-soluble acids in the water, and separating emulsified oleo-resinous aggregate from the resulting mass.

10. In a method of treating oleo-resinous exudates obtained from pine trees, mixing the said oleo-resinous exudates thoroughly with water to form an emulsion and to dissolve in the water the water-soluble acids contained in the said oleo-resinous exudates; and in the latter stages of emulsification after obtaining an increase of acid concentration in the water to effect the increased solvent action resultant of such increase of acid concentration, distributing an alkaline solution throughout the mixture to reduce the acidity of the water, and removing emulsified uncombined oleo-resins from the resulting mass.

11. In a method of treating oleo-resinous exudates obtained from pine trees, mixing the said oleo-resinous exudates and an aqueous medium substantially inert with respect to the said exudates and of higher specific gravity than the oleo-resinous aggregate of the said exudates to dissolve in said medium water-soluble acids contained in the said oleo-resinous exudates, and during at least the latter portion of the period of mixing maintaining the said medium in alkaline condition but avoiding substantial conversion of resin acids into resinates to obtain an oleo-resin aggregate from which water-soluble acids have been removed and in which a major portion of the oleo-resins has been unaffected by the alkalinity of the said aqueous medium.

12. In a method of treating oleo-resinous exudates obtained from pine trees, mixing the said oleo-resinous exudates and an aqueous medium substantially inert with respect to the said exudates and of higher specific gravity than the oleo-resinous aggregate of the said exudates to dissolve in said medium water-soluble acids contained in the said oleo-resinous exudates, and during at least the latter portion of the period of mixing, introducing a solution of alkaline earth hydroxide to reduce the acidity of the said aqueous medium resulting from the mixing operation but avoiding substantial formation of resin soaps, and separating from the resulting mass oleo-resinous aggregate that has been unchanged by the said hydroxide.

13. In a method of treating oleo-resinous exudates obtained from pine trees, mixing the said oleo-resinous exudates and an aqueous medium substantially inert with respect to the said exudates and of higher specific gravity than the oleo-resinous aggregate of the said exudates to dissolve in said medium water-soluble acids contained in the said oleo-resinous exudates, and during at least the latter portion of the period of mixing introducing calcium hydroxide to reduce the acidity of the said aqueous medium resulting from the mixing operation but avoiding substantial formation of resin soaps, and separating from the resulting mass oleo-resinous aggregate that has been substantially unaffected by the calcium hydroxide.

14. In a method of treating oleo-resinous exudates obtained from pine trees, mixing the said oleo-resinous exudates, an aqueous medium substantially inert with respect to the said exudates and of higher specific gravity than the oleo-resinous aggregate of the said exudates, and an alkaline agent to form an emulsion containing a continuous aqueous phase of slight alkalinity and a dispersed emulsion containing oleo-resins uncombined with the alkaline agent.

15. In a method of treating oleo-resinous exudates obtained from pine trees, mixing the said oleo-resinous exudates, an aqueous medium substantially inert with respect to the said exudates and of higher specific gravity than the oleo-resinous aggregate of the said exudates, and an alkaline earth hydroxide to form an emulsion containing a continuous aqueous phase of slight alkalinity and a dispersed emulsion containing oleo-resins uncombined with the said hydroxide.

16. In a method of treating oleo-resinous exudates obtained from pine trees, mixing water and oleo-resinous exudates to form an emulsion, causing solid and semi-solid suspended matter to separate from the emulsion by settling, filtering the emulsion, and separating water from the resulting emulsion to such an extent that the water is no longer present in the oleo-resin product as a continuous phase.

17. In a method of treating oleo-resinous exudates obtained from pine trees, mixing water and oleo-resinous exudates to form an emulsion, causing solid and semi-solid suspended matter to separate from the emulsion by settling, filtering the emulsion, and separating water from the resulting emulsion to such an extent that the water is no longer present in the oleo-resin product as a continuous phase, and incorporating excess water remaining in the said oleo-resin product in a resin soap solution to obtain an oleo-resin aggregate containing a relatively small proportion of the said soap solution.

18. In a method of treating oleo-resinous exudates obtained from pine trees, mixing the said oleo-resinous exudates, an aqueous medium inert with respect to the said exudates and of higher specific gravity than the oleo-resinous aggregate of the said exudates, and an alkali resin soap to form an emulsion containing oleo-resins and an aqueous phase containing the said soap.

19. A method comprising mixing water and oleo-resinous exudates obtained from pine trees to form an emulsion but avoiding dissolution to any substantial extent of component parts of resinous constituents having different specific gravities, discontinuing the mixing and causing the resulting mixture to separate by sedimentation into a plurality of fractions containing resin constituents of different specific gravities, and separately collecting the said fractions.

20. In a method of treating oleo-resinous exudates obtained from pine trees, mixing the said oleo-resinous exudates and water to form an emulsion, causing the emulsion to stratify into fractions of different specific gravities filtering the emulsion to separate solid and semi-solid suspended matter contained in the said exudates, and separating the filtered exudates into fractions of different specific gravities.

21. A composition comprising a fluid emulsion consisting of an aqueous medium and pine oleo-resin exudate, the said aqueous medium being dispersed in the exudate and substantially inert with respect to the said exudate, the said exudate containing a relatively small amount of resinate material selected from a group consisting of alkali, ammonium and alkaline earth resinates dispersed in uncombined resin acids and terpenes of the said exudate, and the said emulsion being non-corrosive to metals.

22. A composition comprising a fluid emulsion consisting of an aqueous medium and pine oleo-resin exudate, the said aqueous medium being dispersed in the exudate and substantially inert with respect to the said exudate, the said exudate containing a relatively small amount of sodium resinate dispersed in uncombined resin acids and terpenes of the said exudate, and the said emulsion being non-corrosive to metals.

23. A composition comprising a fluid emulsion consisting of an aqueous medium and pine oleo-resin exudate, the said aqueous medium being dispersed in the exudate and substantially inert with respect to the said exudate, the said exudate containing a relatively small amount of calcium resinate dispersed in uncombined resin acids and terpenes of the said exudate, and the said emulsion being non-corrosive to metals.

24. A composition comprising a fluid emulsion consisting of an aqueous medium and pine oleo-resin exudate, the said aqueous medium being dispersed in the exudate and substantially inert with respect to the said exudate, the said exudate containing a relatively small amount of ammonium resinate dispersed in uncombined resin acids and terpenes of the said exudate, and the said emulsion being non-corrosive to metals.

25. A composition comprising a fluid emulsion consisting of brine dispersed in pine oleo-resin exudate, the said exudate containing a relatively small amount of resinate material selected from a group consisting of alkali, ammonium and alkaline earth resinates dispersed in uncombined resin acids and terpenes of the said exudate, and the said emulsion being non-corrosive to metals.

26. An emulsified pine oleo-resin comprising an oleo-resin exudate in one component of the emulsion, the said exudate consisting of constituents of substantially all of the relatively water-insoluble portion of pine sap as obtained from living trees including uncombined resin acids, terpenes and other oleaginous constituents normally contained in such sap; and as another component a relatively small amount of an aqueous medium substantially inert with respect to the said oleo-resin exudate, dispersed in the water-insoluble oleo-resin exudate, the said aqueous medium including water other than the natural water content of the said exudate and the said emulsion being substantially non-corrosive to metals and being a stable fluid product at temperatures below that at which active boiling of the said product occurs.

27. An emulsified pine oleo-resin comprising an oleo-resin exudate phase and a dispersed aqueous phase, the said exudate phase consisting of constituents of substantially all of the relatively water-insoluble portion of the exudate as obtained from trees including resin acids, terpenes, and other oleaginous constituents normally contained in crude exudate; the said dispersed aqueous phase including water other than the natural water content of the said exudate and acidified by water-soluble acids originally present in the crude exudate and the said emulsified pine oleo-resin being substantially non-corrosive to metals and being a stable fluid product at temperatures below that at which active boiling of said product occurs.

28. A method comprising thoroughly mixing together an aqueous medium and crude oleoresinous exudates obtained from pine trees and containing water-soluble acids and relatively water-insoluble constituents including resin acids, terpenes, and other oleaginous compounds normally contained in the said exudates, the said aqueous medium being substantially inert with respect to the said water-insoluble constituents, dissolving water-soluble acids in the said aqueous medium and thereby separating them from the said water-insoluble constituents, and dispersing the latter to form a dispersion of a relatively stable emulsion having a dispersed component containing water and a continuous component containing the said water-insoluble constituents.

McGARVEY CLINE.